United States Patent [19]

Rotter

[11] 4,163,263
[45] Jul. 31, 1979

[54] METHOD AND APPARATUS FOR TAPE RECORDING TIME-SPACED SEGMENTS OF VIDEO INFORMATION FROM A VIDEO CAMERA

[75] Inventor: Gerhard Rotter, Mission Viejo, Calif.

[73] Assignee: Basf Aktiengesellschaft, Rheinland-Pfalz, Fed. Rep. of Germany

[21] Appl. No.: 893,456

[22] Filed: Apr. 4, 1978

[51] Int. Cl.² .................. H04N 5/785; H04N 5/04
[52] U.S. Cl. ............................... 360/14; 360/36
[58] Field of Search ............... 360/14, 36, 37, 33; 358/149, 185

[56] References Cited

U.S. PATENT DOCUMENTS

| 3,051,777 | 8/1962 | Lemelson | 360/35 |
| 3,610,822 | 10/1971 | Ingham et al. | 358/105 |
| 3,772,468 | 11/1973 | Tatsuguchi | 360/14 X |
| 3,814,854 | 6/1974 | Edwards | 358/149 |
| 3,887,941 | 6/1975 | Dann et al. | 360/14 X |
| 3,890,639 | 6/1975 | O'Donnell et al. | 360/14 |
| 3,962,725 | 6/1976 | Lemke et al. | 360/36 |
| 3,974,522 | 8/1976 | Fukatsu et al. | 360/14 |
| 3,978,521 | 8/1976 | Langer et al. | 360/14 |
| 4,040,098 | 8/1977 | Beeson et al. | 360/10 X |
| 4,100,607 | 7/1978 | Skinner | 360/14 X |
| 4,133,009 | 1/1979 | Kittler et al. | 360/36 X |

Primary Examiner—Bernard Konick
Assistant Examiner—Donald McElheny, Jr.
Attorney, Agent, or Firm—Fulwider, Patton, Rieber, Lee & Utecht

[57] ABSTRACT

A video recording technique for recording sequential scenes or segments of video information, such as from a video camera, in such a manner that the recorded scenes may be reproduced without loss of synchronization. In a video tape recorder of the longitudinal type, a recording tape is decelerated to a stop at the end of a scene, and is back-spaced for a preselected time or distance. When the camera is next activated, the tape is accelerated to recording speed, and the camera is quickly synchronized with synchronization signals obtained from the tape, before switching to recording mode to record the next scene.

8 Claims, 3 Drawing Figures

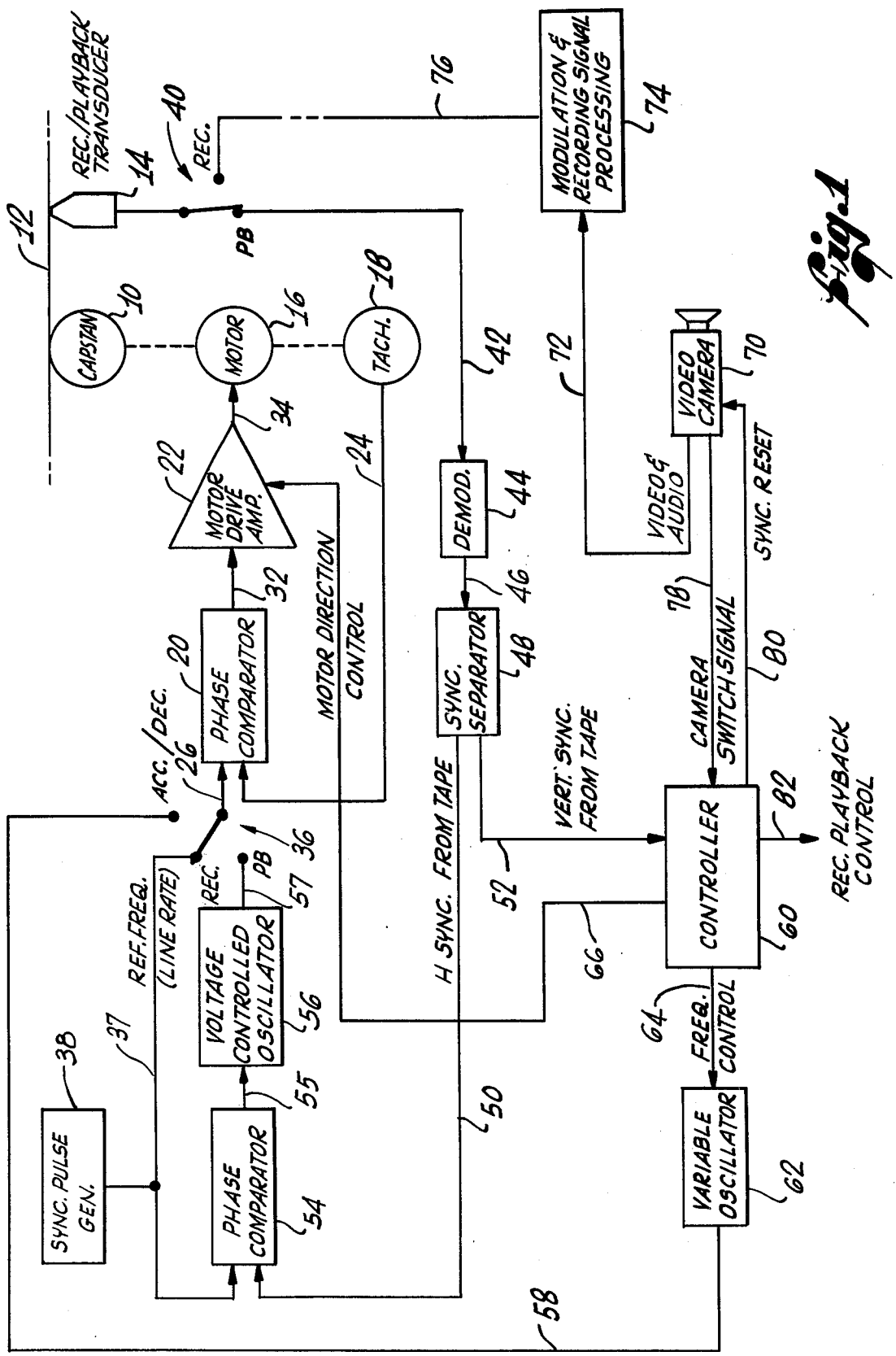

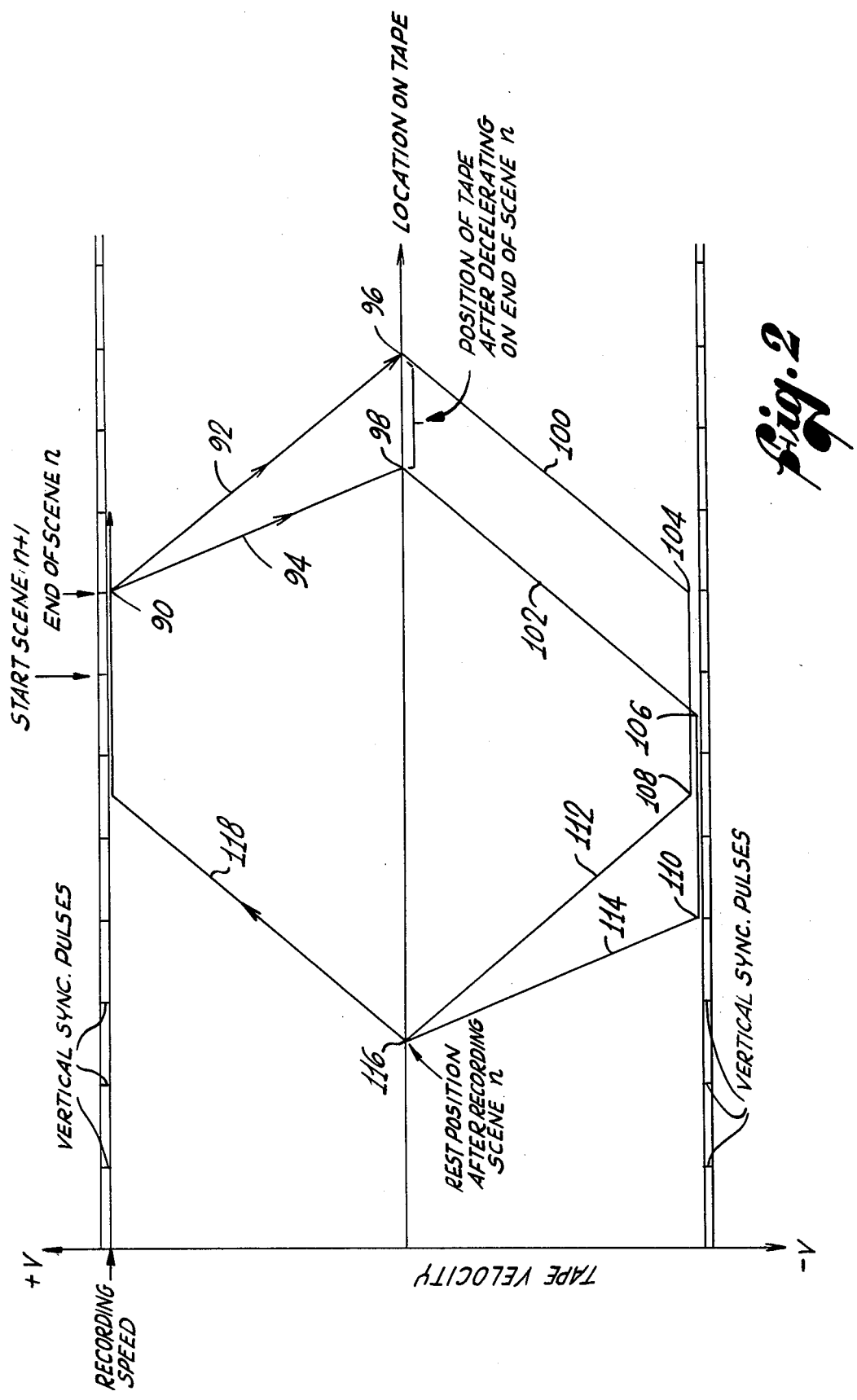

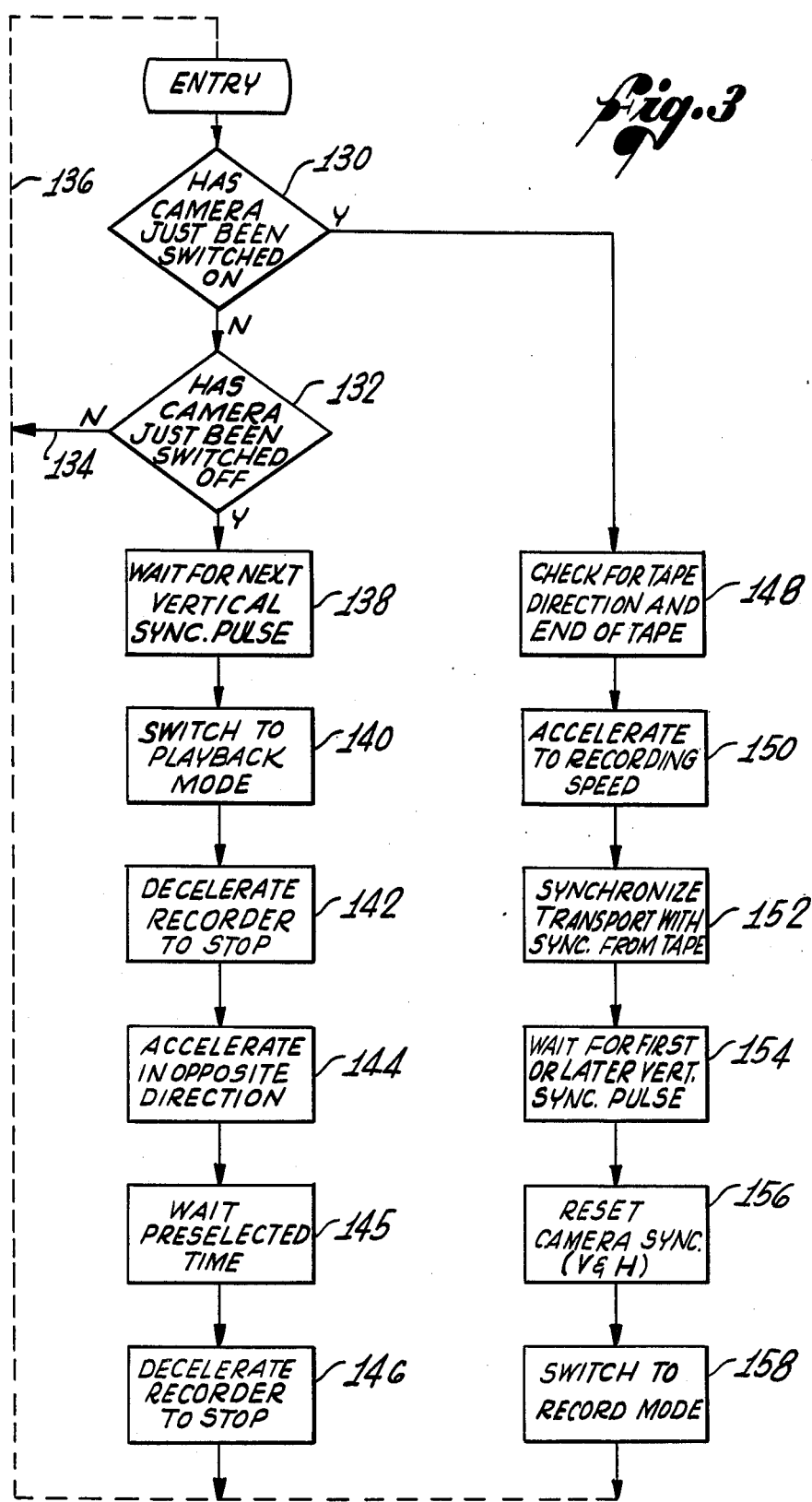

METHOD AND APPARATUS FOR TAPE RECORDING TIME-SPACED SEGMENTS OF VIDEO INFORMATION FROM A VIDEO CAMERA

BACKGROUND OF THE INVENTION

The present invention relates generally to video tape recording systems, and, more particularly, to such systems in which multiple segments of video information are to be recorded on a tape sequentially, but at time-spaced intervals.

When a video tape recorder is employed to record television programs, it is typically run in a recording mode for relatively long, uninterrupted periods of time. Moreover, a recorder used to record television programs will only rarely be operated in playback mode in such a manner that two or more recorded program segments are played back without stopping the tape. However, when a recorder is utilized in conjunction with a video camera, in what might be referred to as a "home movie" mode of operation, the recorder will be started and stopped very frequently, and the recorded scene length will typically be only several seconds long.

Tape transport apparatus used in video recording systems require a significant time interval to accelerate the tape to recording speed, and to decelerate the tape when recording is to be stopped. If the tape is merely decelerated at the end of the recording of one scene, and accelerated again at the beginning of the recording of the next scene, line and field synchronizing signals recorded on the tape with the video information would be unevenly spaced along the tape. Even if recording was suppressed during the tape acceleration and deceleration times, there would be a significant discontinuity in the sequence of synchronization signals. Consequently, if the tape was to be played back at full speed, there would be a temporary loss of synchronization in the reproduced video image, and an accompanying roll of the picture image at each scene change. Since the scenes may be only several seconds long, these frequent losses of synchronization would be a continual source of inconvenience and annoyance to viewers of the system.

In recorders of the helical scan type, the aforedescribed problem has been solved by back-spacing the recorder on completion of one scene; then, on starting recording of the next scene, synchronizing the camera with the video material recorded at the end of the previous scene before switching to the recording mode. However, in helical scan recorders, it may take as long as five or six seconds to bring the tape transport apparatus up to recording speed and to lock onto the synchronization signals obtained from the tape. Clearly, this delay period is unacceptable, since the scene itself may not be much longer than the delay period. Accordingly, there has been a real need for a video tape recording system in which synchronization is preserved between sequentially recorded scenes, without the penalty of a large delay time prior to the recording of each scene. The present invention fulfills this need.

SUMMARY OF THE INVENTION

The present invention resides in a method and corresponding apparatus for recording sequential, time-spaced scenes in a video tape recorder of the longitudinal type. In longitudinal video tape recorders, the tape is moved at a relatively high speed with respect to a stationary record/playback head, rather than at a slower speed with respect to a rapidly rotating head.

Basically, and in its most fundamental method terms, the invention comprises the steps of decelerating the tape to a stop after recording a first scene, accelerating the tape in the opposite direction until recording speed is reached, moving the tape at a relatively high speed in the opposite direction for a preselected period of time, and decelerating the tape to a stop again. On recording a second scene, the tape is accelerated to recording speed in the original direction, and synchronization pulses are read from the tape and utilized to synchronize the operation of a video camera before the recorder is again switched to the recording mode. The steps of accelerating the tape to recording speed, and locking onto the synchronization signals reproduced from the tape, take only a few hundred milliseconds to perform, and this delay is scarcely noticeable to the user of the system.

In terms of novel apparatus, the invention comprises means for stopping and back-spacing the tape upon deactuation of the camera at the end of a particular scene, means for accelerating the tape to recording speed upon actuation of the camera at the start of the next scene, and means for synchronizing the recording system and the camera with synchronization signals read from the tape, prior to switching the recorder to the recording mode and recording the next scene.

More specifically, the method of the invention comprises the steps of determining whether the camera has just been switched off at the end of a scene, and, if it has, waiting for the next vertical synchronization pulse on the tape, switching to playback mode, and decelerating the tape to a stop. Then follow the backspacing steps of accelerating the tape in a direction opposite to the original recording direction, waiting for a preselected time to elapse, and again decelerating the tape to a stop. The method also includes the steps of determining whether the camera has just been switched on to record a new scene, and, if it has, accelerating the tape to recording speed, synchronizing the tape transport apparatus with horizontal synchronization pulses read from the tape, waiting for at least one vertical synchronization pulse and, on detection of the vertical synchronization pulse, resetting the camera synchronization and switching to the recording mode.

It will be appreciated from the foregoing that the present invention provides a video recording system in which synchronization is preserved between sequentially recorded scenes, without the penalty of a large delay time prior to the recording of each scene. Other aspects and advantages of the invention will become apparent from the following more detailed description, taken in conjunction with the accompanying drawings.

BRIEF DESCRIPTION OF THE DRAWINGS

FIG. 1 is a simplified schematic diagram showing portions of a longitudinal video tape recording system in which the present invention may be employed;

FIG. 2 is a velocity-versus-location diagram relating to movement of the recording tape in accordance with the invention; and FIG. 3 is a flow chart defining the sequence of functions performed by the apparatus of the invention, and particularly by the controller of FIG. 1.

DESCRIPTION OF THE PREFERRED EMBODIMENT

As shown in the drawings for purposes of illustration, the present invention is concerned with a technique for recording multiple sequential scenes in a video tape recording system, in such a manner that the scenes may be played back without loss of synchronization. In accordance with the invention, this is accomplished in a longitudinal video recording system by back-spacing the recording tape at the end of each recorded scene and then, before starting recording of the next scene, very rapidly synchronizing operation of the recording system with synchronization signals obtained from the tape.

In longitudinal video tape recording systems, the recording tape is moved relatively rapidly with respect to a record/playback transducer head, rather than being moved at a slower speed with respect to one or more rapidly rotating transducers. To obtain substantial recording time on a tape, there are usually multiple longitudinal recording tracks positioned across the width of the tape. The tape direction is reversed when the end of the tape is reached, and the recording head is appropriately stepped to a new track position.

As shown in FIG. 1, such a longitudinal tape recording system includes a capstan, indicated by reference numeral 10, which drives a recording tape 12 past a record/playback transducer 14. The capstan 10 is mechanically coupled to a drive motor 16 which has associated with it a tachometer 18 for obtaining an accurate determination of the motor speed.

It will be appreciated that the speed of the tape 12 relative to the transducer 14 has to be accurately regulated both during recording and during reproduction of video information. Any of a number of different techniques might be used for controlling the speed of the motor 16, but for purposes of illustration, the motor is shown as being controlled primarily by means of a servo control loop comprising the tachometer 18, a phase comparator 20 and a motor drive amplifier 22. The tachometer 18 generates pulses at a line frequency rate when the tape is moving at the desired speed, and these pulses are transmitted over line 24 to one input of the phase comparator 20, the other input of which, on line 26, is a signal at a reference frequency. The output of the phase comparator 22 is connected by line 32 to the motor drive amplifier 22, the output of which is connected by line 34 to the motor 16. It will be appreciated that, when the phase comparator 20 detects any phase difference between pulses generated by the tachometer 18 and pulses supplied over line 26 at the reference frequency, a difference signal is generated in the phase comparator and is used in the motor drive amplifier 22 to drive the motor either faster or slower until the detected phase difference is driven to zero. The effect of the tachometer servo control loop, then, is to lock the motor speed to the rate of reference-frequency signal supplied on line 26.

As shown in FIG. 1, line 26 is connected to the movable contact terminal of a three-position switch 36 having a "record" position, a "playback" position and an accelerate/decelerate position. In the "record" position, the switch 36 connects line 26 to a line 37 on which is provided a reference signal, at the desired line-frequency rate, derived from a crystal-controlled pulse generator 38. Thus, in the recording mode, the tape speed is locked to the reference frequency by means of the aforedescribed servo control loop.

In the playback mode, an additional servo control loop is brought into operation, to synchronize operation of the motor 16 with synchronization signals read from the tape 12. More specifically, signals from the tape 12 are detected by the record/playback transducer 14, which is connected to the movable contact terminal of single-pole-double-throw switch 40 having a record and a playback position. In the playback position, the signal from the transducer 14 is transmitted over line 42 to a demodulator 44, where it is demodulated to obtain a composite baseband video signal, on line 46 from the demodulator. Line 46 transmits the baseband signal to a conventional synchronization separator 48 which derives from the baseband signal horizontal synchronization signals, for output on line 50, and vertical synchronization signals, for output on line 52. The horizontal synchronization signals on line 50 are transmitted to another phase comparator 54, the other input of which is a reference signal supplied on line 37 from the pulse generator 38. The phase comparator 54 generates an error signal on line 55, which is employed to control the frequency of a voltage-controlled oscillator 56, and the output of the oscillator is connected by line 57 to the playback position terminal of the three-position switch 36. Thus, in playback mode, synchronization signals derived from the tape are compared with the reference-frequency signals in the phase comparator 54, and the voltage controlled oscillator 56 generates pulses at an appropriate frequency to drive the tape in synchronism with the reference frequency on line 37.

For purposes of speed control during acceleration and deceleration, the reference signal on line 26 is supplied over line 58 from a controller 60. This signal can be varied in frequency by the controller, as indicated diagrammatically by a variable-frequency oscillator 62 controlled by signals from the controller over line 64.

It will be appreciated that the variable-frequency reference signals on line 58 needed for controlled acceleration and deceleration of the tape 12 can be generated in any of a variety of ways. For example, an acceleration ramp of increasing frequency can be synthesized within the controller 60 itself, rather than by means of the external oscillator 62. In addition, it should be noted that the simplified schematic of FIG. 1 does not include time base error correction circuitry, which would normally be needed to correct for fluctuations in tape speed caused by variations in tape tension, or by other factors, such as irregularities in the tape transport apparatus. While such circuitry is essential to the proper reproduction of recorded video information, it forms no part of the present invention, and has therefore been omitted for clarity.

In addition to generating what are essentially speed control signals on line 62, the controller 60 also generates a motor direction control signal on line 66 to the motor drive amplifier 22, and receives vertical synchronization signals from the sync separator 48 over line 52. In the recording mode, a video camera 70 generates both video and, optionally, audio signals on line 72, and these are suitable modulated and processed, as indicated at 74, before transmission over line 76 to the switch 40, and thence to the record/playback transducer 14. When the camera 70 is activated or deactivated, an appropriate signal is transmitted over a camera switch signal line 78 to the controller 60, which controls the motor 16 in response to these signals. As will be further described, the controller 60 also provides a synchronization reset signal on line 80 to the video camera 70. The controller 60 also generates a record/playback control signal, as indicated at 82, to control the switches 36 and 40, and for other purposes in the recording system.

It will be appreciated that the controller 60 may utilize hard-wired logic to perform the necessary motor control functions, as determined in part by the camera switch signal on line 78 and in part by the vertical synchronization signal on line 52. More conveniently, however, the controller 60 can take the form of a microcomputer or microprocessor, and it may then be used to perform other control functions associated with the recording system. Whether the controller 60 is implemented in hard-wired form or in microprocessor form, the functions it performs are identical, and these are defined by the flow chart of FIG. 3, taken in conjunction with the velocity-location diagram of FIG. 2.

In FIG. 2, the direction of recording on the longitudinal recording tape is from left to right, i.e., the tape is translated from right to left with respect to the stationary record/playback transducer 14. When a scene, indicated as scene n, is being recorded, the camera switch signal on line 78 (FIG. 1) indicates that the camera switch is actuated, and the controller 60 generates a record signal on line 82, which maintains the switches 28 and 40 in the record position. Accordingly, a reference frequency at the line scanning rate will be supplied to the phase comparator 20, and the motor 16 will be driven at recording speed in the forward direction.

When the camera switch is released, the signal on line 78 conveys this information to the controller 60, and, on detection of the next vertical synchronization pulse from the tape, as indicated at 90 in FIG. 2, the controller will decelerate the tape until it has stopped. The controller 60 effects the deceleration by generating on line 58 a series of pulses at a continually reducing frequency. The controller 60 also controls the switch 36 so that, during acceleration or deceleration, the controller-generated, variable-frequency signals on line 58 are connected to the input of the phase comparator 20 over line 26. Since the motor 16 is constrained by the feedback loop comprising the tachometer 18, phase comparator 20 and motor drive amplifier 22, to conform with the pulse rate of the signals supplied on line 26 to the phase comparator 20, the motor will slow down at an approximately linear rate, as shown by the ramp 92 in FIG. 2. However, due to varying frictional effects related to the motor 16 and tape transport system, the motor and the tape may slow down at a more rapid rate, as indicated by the steeper ramp 94. In any event, the tape will be decelerated to a zero velocity at some location between the points indicated at 96 and 98, depending upon the frictional effects involved.

As soon as it has stopped, the tape will be accelerated in an opposite direction, as indicated by the acceleration ramps 100 and 102, respectively, again depending on the frictional effects which were present during deceleration. On reaching recording speed in the reverse direction, as indicated by points 104 and 106, respectively, the tape is transported at recording speed in the opposite direction for a predetermined period of time, i.e., to points 108 or 110. Then the tape is decelerated to zero velocity again, as indicated by the alternate deceleration ramps 112 and 114. If the frictional effects in the reverse direction of tape movement are exactly equivalent to the frictional effects during deceleration in the forward direction, the tape will reach a rest position, indicated at 116, which will be the same regardless of which of the two alternate paths is followed. As a practical matter, the frictional effects as measured in the two tape directions will probably be approximately equal, and the tape will therefore reach approximately the same rest position in all cases.

After reaching the rest position indicated at 116 (FIG. 2), the tape will remain in this position until the camera switch is once again actuated to begin recording the next scene. When this occurs, the tape is accelerated, as indicated by the acceleration ramp 118. On reaching recording speed again in the forward direction, the tape provides the controller 60 with recorded vertical synchronization information over line 52. On detection of the first or a subsequent vertical synchronization signal obtained from the tape, synchronization of the camera 70 is reset by transmitting an appropriate signal over line 80. At the same time, the system is switched to the recording mode, and the video information from the camera 70 is then recorded in synchronism with the recorded information in the previous scene. One or more fields of the previous scene will be necessarily erased as the new scene is recorded, but the amount lost information is relatively insignificant, and not noticeable during playback.

The foregoing functional sequence of operations of the controller is illustrated in flow chart form in FIG. 3. On entry to this functional sequence, a check is first made, as indicated at block 130, to determine whether the camera 70 has just been switched on. It is has not, a question is asked to determine whether the camera 70 has just been as indicated at block 132. If it has not, there has been no change since the last time these questions were posed, and exit is made as shown at 134. It will be appreciated that, if the controller 60 is in microprocessor form, the microprocessor will, on exit from the described functional sequence, be performing other functions unrelated to the present invention, as indicated by the broken line 136. If it is determined in block 132 that the camera 70 has just been switched off, this indicates that the scene presently being recorded is to be ended. On detection of the next vertical synchronization pulse, as indicated in block 138, the system is switched to playback mode, as indicated in block 140, and the recorder is decelerated to a stop, as indicated in block 142. Then, the tape is accelerated in the reverse direction, as indicated in block 144, is moved at recording speed in the reverse direction for a preselected time, as indicated in block 145, and is again decelerated to a stop, as indicated in block 146. At this point, the tape rests in the position shown at 116 in FIG. 2, and nothing further remains to be done until the camera is again activated.

When this occurs, it will be detected in block 130, after which a check is made for the direction in which the tape is being transported, and for an end-of-tape condition, as indicated in block 148. It will be appreciated that, in longitudinal-type recorders, the recording tape may be moved in either direction, so it is necessary to determine the current direction of travel before initiating recording of a new scene. Similarly, when the tape approaches the end of a reel, appropriate action must be taken to avoid starting a new scene too close to the time at which the tape will be reversed. The statistical probability of this occurring is relatively low, but it is necessary to make allowance for such an occurrence. The tape is accelerated to recording speed, as indicated at block 150, and the tape transport system is synchronized with horizontal synchronization signals from the tape, as indicated at block 152. In fact, this latter function is not performed by the controller, but by the servo-control loop described in conjunction with FIG. 1. Synchronizing with the horizontal synchronization signals from the tape takes only a few milliseconds. Then, the first or a subsequent vertical synchronization pulse is detected from the tape, as indicated at block 154, and, at this point, a reset pulse is supplied to the camera 70 over the synchronization reset line 80, as indicated at block 156. Finally, and essentially simultaneously with the generation of the reset pulse on line 80, the system is switched to the recording mode, as indicated at block 158, and exit is made from this functional sequence. Acceleration and synchronization at the start of recording a new scene can be accomplished in only a few hundred milliseconds, as compared with several seconds for a helical scan recorder.

Although the controller 60 is believed to be more than adequately disclosed by the accompanying drawings and the foregoing description, an even more detailed disclosure switched off, is provided by Appendixes A and B to this specification. Appendix A sets forth the input/output port allocations for an F-8 microprocessor, part no. 3870, manufactured by Mostek Corporation, of Carrollton, Texas, Fairchild Camera and Instrument Corporation, of Mountain View, California, and others. The microprocessor is used to perform the functions of the controller 60, and the port allocations are needed to completely define the hardware interface between the microprocessor and other components shown in FIG. 1. Appendix B is a complete listing, in both source language and hexadecimal code, of the programs stored and executed in the microprocessor, including the programs which perform the functions of the controller 60.

It will be appreciated from the foregoing that the present invention represents a significant advance in the field of video tape recording. In particular, it provides a convenient technique for recording successive scenes on a video tape with loss of synchronization between the scenes when they are played back. Although the invention is best suited for application in the recording of multiple scenes from a video camera source, the same technique can also be easily adapted for recording successive program segments from other sources, such as television program segments recorded off the air. It might be advantageous, for example, to edit television program material by stopping the recorder during portions of a program that a user did not wish to record. The edited portions of the program could then be played back without loss of synchronization between the scenes. if the video source from which a recording is being made is a television broadcast, it is necessary to synchronize that tape movement with both horizontal and vertical synchronization signals contained in the video source, before switching to the recording mode.

It will also be appreciated that, although a particular embodiment of the invention has been described in detail for purposes of illustration, various modifications may be made without departing from the spirit and scope of the invention. Accordingly, the invention is not to be limited except as by the appended claims.

APPENDIX A

MOSTEK MODEL F-8 MICROPROCESSOR
INPUT/OUTPUT PORT ALLOCATIONS

| Port | Pin No. | Signal Name and Description | Type |
|---|---|---|---|

APPENDIX A-continued

MOSTEK MODEL F-8 MICROPROCESSOR
INPUT/OUTPUT PORT ALLOCATIONS

| Port | Pin No. | Signal Name and Description | Type |
|---|---|---|---|
| P0-0 | 3 | Ramp[1] | Output |
| 1 | 4 | Turnaround (tape in turnaround phase) | Output |
| 2 | 5 | Full count (tape up to speed) | Output |
| 3 | 6 | Count down (tape decelerating) | Output |
| 4 | 19 | Forward (direction of tape) | Output |
| 5 | 18 | Enable forward (motor control)[2] | Output |
| 6 | 17 | Enable forward (motor control)[2] | Output |
| 7 | 16 | Zero count (tape stopped) | Output |
| P1-0 | 37 | Leadscrew forward (relates to tape loading and unloading) | Output |
| 1 | 36 | Leadscrew forward (relates to tape loading and unloading) | Output |
| 2 | 35 | Stepper forward (control of current tape track) | Output |
| 3 | 34 | Stepper forward (control of current tape track) | Output |
| 4 | 22 | Play[3] | Output |
| 5 | 23 | Standby (relates to loading/unloading) | Output |
| 6 | 24 | Record[3] | Output |
| 7 | 25 | Fast unload | Output |
| P4-0 | 8 | Display latch (used in conjunction with display outputs) | Output |
| 1 | 9 | Hole sense (tape sensing) | Output |
| 2 | 10 | Turnaround flag (recorded flag on tape) | Output |
| 3 | 11 | Vertical sync.[4] | Output |
| 4 | 12 | End track (relates to headstepper for track selection) | Output |
| 5 | 13 | Odd track (relates to headstepper for track selection) | Output |
| 6 | 14 | Error (relates to headstepper for track selection) | Output |
| 7 | 15 | Direction (relates to headstepper for track selection) | Output |
| P5-0 | 33 | DS 1 (display control signal and switch strobe signal - see note 5) | |
| 1 | 32 | DS 2 (display control signal and switch strobe signal - see note 5) | |
| 2 | 31 | DS 3 (display control signal and switch strobe signal - see note 5) | |
| P5-3 | 30 | DS 4 (display control signal and switch strobe signal - see note 5) | |
| 4 | 29 | SW 1 (input switch - see note 5) | Input |
| 5 | 28 | SW 2 (input switch - see note 5) | Input |
| 6 | 27 | SW 3 (input switch - see note 5) | Input |
| 7 | 26 | SW 4 (input switch - see note 5) | Input |

| Strobe Signal | SW 1 | SW 2 | SW 3 | SW 4 |
|---|---|---|---|---|
| DS 1 | BOT[6] | EOT[6] | BOL + EOL[7] | Contact[8] |
| DS 2 | Pwr. Pack[9] | Timer | — | — |
| DS 3 | — | Backspace[11] | Record[11] | Play[11] |
| DS 4 | Stop[11] | Step up[12] | Step dn.[12] | Load/ |

APPENDIX A-continued
MOSTEK MODEL F-8 MICROPROCESSOR INPUT/OUTPUT PORT ALLOCATIONS unload[12]

Explanatory Notes
[1]"Ramp" signal steps the variable oscillator G2 (FIG. 1) to the next phase of its operation, at a higher or lower frequency.
[2]These are the motor direction control signals on line 66 (FIG. 1).
[3]These are the record/playback signals on line 82 (FIG. 1). The record signal is also utilized to generate a sync reset signal, as indicated by line 80 (FIG. 1).
[4]This is the vertical synchronization signal received on line 52 (FIG. 1).
[5]The switches S1-S4 are multiplexed into the controller by strobe signals DS1-DS4. The switches have the meanings indicated in the table above.
[6]Beginning of tape and end of tape.
[7]Beginning (or end) of leadscrew travel (relates to tape loading/unloading).
[8]Tape in contact with capstan.
[9]Indicates whether recorder is operating on a power pack (ac power supply) or in a "portable" mode with a video camera.
[10]Manual switch for timed recording.
[11]Manual switches for recorder control. When in the "portable" mode of operation (see 9), the "record" switch is the camera switch.
[12]Manual switches for track selection and loading/unloading of tape cassette.

APPENDIX B
MICROPROCESSOR PROGRAM LISTING

```
******* REGISTER DIRECTORY *********

*  SW1     R0-0     BOT
*          R0-1     EOT
*          R0-2     BOL+EOL
*          R0-3     CONTACT(-)
*          R0-4     PWR PAC
*          R0-5     TIMER
*          R0-6     N/C
*          R0-7     N/C

*  SW2     R1-0     N/C
*          R1-1     BACKSPACE SW
*          R1-2     RECORD SW
*          R1-3     PLAY SW
*          R1-4     STOP SW
*          R1-5     STEPDOWN SW
*          R1-6     STEPUP SW
*          R1-7     LOAD/UNLOAD SW

*  CONR    R2-0     RAMP
*  (P0)    R2-1     TURNAROUND
*          R2-2     FULL COUNT
*          R2-3     COUNT DOWN
*          R2-4     FORWARD
*          R2-5     ENABLE FORWARD
*          R2-6     ENABLE BACKWARD
*          R2-7     ZERO COUNT(-)

*  STAR    R3-0     LEADSCREW FORWARD
*  (R1)    R3-1     LEADSCREW BACKWARD
*          R3-2     SEEK ODD(-)
*          R3-3     BACKWARD STEP(-)
*          R3-4     PLAY OUTPUT
*          R3-5     STANDBY OUTPUT
*          R3-6     RECORD OUTPUT
*          R3-7     FAST UNLOAD OUTPUT

*  INR     R4-0     LATCH
*  (P4)    R4-1     HOLE SENSE
*          R4-2     TURNAROUND FLAG
*          R4-3     VERTICAL DRIVE
*          R4-4     END TRACK
*          R4-5     ODD TRACK
*          R4-6     N/C
*          R4-7     N/C

*  DSP     R5-0     DISPLAY DIGIT 1
*  (P5)    R5-1     DISPLAY DIGIT 2
*          R5-2     DISPLAY DIGIT 3
*          R5-3     DISPLAY DIGIT 4
*          R5-4     SWITCH INPUT 1
```

```
*           R5-5        SWITCH INPUT 2
*           R5-6        SWITCH INPUT 3
*           R5-7        SWITCH INPUT 4

* TIM1      R6          TIMER REGISTER 1

* TIM2      R7          TIMER REGISTER 2

* TEM1      R8          TEMPOARY STORAGE 1

* TEM2      R9          TEMPOARY STORAGE 2

* FLG1      R10-0       STEP FLAG
*           R10-1       PLAY OR UNTH FLAG
*           R10-2       RECORD FLAG
*           R10-3       BLANK FLAG
*           R10-4       N/C
*           R10-5       DIGIT BLANK FLAG
*           R10-6       N/C
*           R10-7       N/C

* FLG2      R11-0       DISPLAY FLAG
*           R11-1       SLOW FLAG
*           R11-2       FORWARD FLAG
*           R11-3       N/C
*           R11-4       N/C
*           R11-5       N/C
*           R11-6       N/C
*           R11-7       N/C

* R16,17                DISPLAY
* R24,25                TIME OF DAY
* R32,33                TIME OF START
* R40,41                RUN TIME
* R48                   TRACK
* R56                   DAYS

* THIS PROGRAM IS TO BE USED WITH THE
* 3870 EMULATOR BOARD FROM MOSTEK
* WHEN THE PROGRAM IS PROVEN TO WORK
* IT CAN BE TRANSFERED TO MASK ROM
* IN PRODUCTION 3870 SYSTEMS.
```

```
0000              SW1   EQU   0        SWITCHES 1
0001              SW2   EQU   1        SWITCHES 2
0000              CONP  EQU   0        CONTROL PORT
0002              CONR  EQU   2        CONTROL REGISTER
0001              STAP  EQU   1        STATUS PORT
0003              STAR  EQU   3        STATUS REGISTER
0004              IPOR  EQU   4        INPUT PORT
0004              INR   EQU   4        INPUT REGISTER
0005              DSP   EQU   5        DISPLAY STROBE REGISTER
0005              DSPP  EQU   5        DISPLAY & SWITCH PORT
0006              TIM1  EQU   6        TIMER REGISTER 1
0007              TIM2  EQU   7        TIMER REGISTER 2
0008              TEM1  EQU   8        TEMPOARY STORAGE 1
0009              TEM2  EQU   9        TEMPOARY STORAGE 2
000A              FLG1  EQU   10       FLAGS 1
000B              FLG2  EQU   11       FLAGS 2
0002              DSPR  EQU   2        DISPLAY REGISTER ISAR UPPER
0003              TOD   EQU   3        TOD REGISTER ISAR UPPER
0004              TOS   EQU   4        TOS REGISTER ISAR UPPER
0005              RT    EQU   5        RT  REGISTER ISAR UPPER
0006              TRK   EQU   6        TRACK REGISTER ISAR UPPER
0007              DAYS  EQU   7        DAYS REGISTER ISAR UPPER
```

```
********* POWER ON ****************

0000 A4                 INS   IPOR
0001 21 20              NI    H'20'    CHECK ODD
0003 94 03              BNZ   P1
0005 74                 LIS   4        IF ODD, SET SEEK ODD
0006 B1                 OUTS  STAP
0007 70           P1    LIS   0
0008 B0                 OUTS  CONP
```

```
0009 0B              LR   IS,A
000A 70        P2    LIS  0
000B 5C              LR   S,A
000C 0A              LR   A,IS
000D 1F              INC
000E 0B              LR   IS,A
000F 21 3F           NI   H'3F'
0011 94 FB           BNZ  P2      CLEAR ALL SCRATCH
0013 78              LIS  8
0014 5A              LR   FLG1,A  SET BLANK FLAG
0015 28 03 13        PI   DSPY
0018 28 03 13        PI   DSPY
001B 28 03 13        PI   DSPY
001E 90 02           BR   *+3
0020 0D        INTT  LR   PO,Q
0021 28 03 13        PI   DSPY
0024 A1              INS  STAP
0025 53              LR   STAR,A  SET SKOD STATUS
0026 74              LIS  4
0027 F0              NS   SW1
0028 84 77           BZ   INTX    BOL+EOL ?
002A 20 EA           LI   H'EA'           UNTHREAD
002C 86              OUTS 6
002D 20 B8           LI   184
002F 87              OUTS 7          SET 18 MS TIMER
0030 20 10           LI   H'10'
0032 F0              NS   SW1
0033 84 1F           BZ   INRT    DONT STEP HEAD IF PORTABLE
0035 73        P5    LIS  3
0036 56              LR   TIM1,A  SET 54 MS TIMER
0037 2A 00 44        DCI  IT1
003A 0E              LR   Q,DC
003B 1B        P4    EI
003C 90 FE           BR   *-1
003E 66        P3    LISU TRK
003F 68              LISL 0
0040 71              LIS  1
0041 5C              LR   S,A     SET TRACK NO TO 1
0042 90 10           BR   INRT
0044 A4        IT1   INS  IPOR
0045 21 30           NI   H'30'
0047 25 30           CI   H'30'
0049 84 F4           BZ   P3      BRANCH IF TRACK 1
004B 36              DS   TIM1
004C 94 EE           BNZ  P4
004E 28 05 09        PI   STOV    IF NOT KEEP LOOKING
0051 90 E3           BR   P5

.********** INPUT ROUTINE *************

0053 08        INRT  LR   K,P
0054 1A              DI
0055 28 03 13        PI   DSPY    READ SWITCHES
0058 20 F7           LI   H'F7'
005A FA              NS   FLG1
005B 5A              LR   FLG1,A  RESET BLANK FLAG
005C A4              INS  IPOR    READ INPUTS
005D 54              LR   INP,A   AND STORE
005E 73              LIS  3
005F F0              NS   SW1
0060 25 03           CI   3       BOT&EOT ?
0062 84 68           BZ   STOP    SOMETHING IS WRONG
0064 72              LIS  2       OK SO FAR
0065 F4              NS   INR     HOLE ?
0066 84 05           BZ   I2
0068 71              LIS  1       GOT A HOLE
0069 F0              NS   SW1     HOW ABOUT BOT ?
006A 84 35           BZ   INTX    NO - MAYBE BROKEN TAPE
006C 66        I2    LISU TRK
006D 68              LISL 0
006E 4C              LR   A,S
006F 62              LISU DSPR
0070 5D              LR   I,A
0071 70              LIS  0
```

```
0072 5C              LR    S,A        TRACKS TO DSPY REGISTER
0073 72              LIS   2
0074 FA              NS    FLG1       IS THE PLAY OR UNTH FLAG SET ?
0075 84 03           BZ    I3         IF NOT, READ SWITCHES
0077 09              LR    P,K
0078 1C              POP
0079 20 20     I3    LI    H'20'
007B F0              NS    SW1        IS THE TIMER ON ?
007C 94 64           BNZ   TIME       IF SO, GO TO TIME
007E 70              LIS   0
007F E1              XS    SW2        LOAD WITH STATUS
0080 91 26           BM    I4         LOAD/UNLOAD SWITCH
0082 71              LIS   1
0083 FA              NS    FLG1
0084 94 36           BNZ   I10        BRANCH IF STEP FLAG SET
0086 20 EA           LI    H'EA'
0088 B6              OUTS  6          LOAD INTERUPT
0089 20 B8           LI    184
008B B7              OUTS  7          SET TIMER
008C 20 17           LI    23
008E 56              LR    TIM1,A     SET .4 SEC TIMER
008F 41              LR    A,SW2
0090 13              SL    1
0091 91 20           BM    I7         STEP UP SWITCH
0093 13              SL    1
0094 91 20           BM    I8         STEP DOWN SWITCH
0096 13              SL    1
0097 13              SL    1
0098 91 32     I11   BM    I5         PLAY SWITCH
009A 13              SL    1
009B 91 2A           BM    I12        RECORD SWITCH
009D 13              SL    1
009E 90 04           BR    *+5
00A0 29 01 C3  INTX  JMP   UNTH
00A3 91 14           BM    I9         BACKSPACE SWITCH
00A5 90 AD           BR    INRT
00A7 7C       I4     LIS   H'C'
00A8 F0              NS    SW1
00A9 23 0C           XI    H'C'       CHECK BOL+EOL & CONTACT
00AB 84 03           BZ    I6         IF UNLOADED, LOAD
00AD 90 F2           BR    INTX       OTHERWISE UNLOAD
00AF 29 02 65  I6    JMP   THRD
00B2 29 05 20  I7    JMP   MSTU
00B5 29 05 25  I8    JMP   MSTD
00B8 29 04 A9  I9    JMP   BKSP
00BB 2A 04 9C  I10   DCI   IT8
00BE 0E              LR    Q,DC
00BF 1B              EI
00C0 2B              NOP
00C1 1A              DI
00C2 41              LR    A,SW2
00C3 15              SL    4
00C4 90 03           BP    I11
00C6 20 10     I12   LI    H'10'
00C8 F0              NS    SW1
00C9 94 89           BNZ   INRT       DONT RECORD IF PORTABLE
00CB 29 03 65  I5    JMP   PLAY

********** STOP ROUTINE ****************

00CE 20 FD    STOP  LI    H'FD'
00D0 F2              NS    CONR
00D1 B0              OUTS  CONP       RESET TURNAROUND
00D2 52              LR    CONR,A
00D3 7C              LIS   H'C'
00D4 F3              NS    STAR
00D5 81              OUTS  STAP       RST PLAY, REC, STBY, & LS
00D6 53              LR    STAR,A
00D7 70              LIS   0
00D8 5A              LR    FLG1,A     RST UNTH, PLAY AND REC FLAGS
00D9 28 05 A1        PI    STM
00CC 70              LIS   0
00DD 5B              LR    FLG2,A     RESET TIMER, 15 IPS, ECT
00DE 29 00 53        JMP   INRT
```

********* TIMER ROUTINE **********

```
00E1 20 CA        TIME  LI    H'CA'
00E3 B6                 OUTS  6         LOAD INTERUPT PORT
00E4 20 B8              LI    184
00E6 B7                 OUTS  7         LOAD 9 MS TIMER
00E7 20 2E              LI    46
00E9 56                 LR    TIM1,A    LOAD .413 SEC TIMER
00EA 20 91              LI    145
00EC 57                 LR    TIM2,A    LOAD 1 MIN TIMER
00ED 20 20        TM1   LI    H'20'
00EF F0                 NS    SW1
00F0 84 00              BZ    STOP      STOP IF TIMER TURNED OFF
00F2 20 10              LI    H'10'
00F4 F1                 NS    SW2
00F5 94 58              BNZ   TM2       RUN TIME
00F7 41                 LR    A,SW2
00F8 15                 SL    4
00F9 91 57              BM    TM3       TIME OF START
00FB 13                 SL    1
00FC 13                 SL    1
00FD 91 56              BM    TM4       DAYS
00FF 63                 LISU  TOD
0100 2A 01 57     TM6   DCI   IT7
0103 0E                 LR    0,DC
0104 1B                 EI
0105 2B                 NOP
0106 1A                 DI
0107 68           TM5   LISL  0
0108 4D                 LR    A,I
0109 59                 LR    TEM1,A
010A 4C                 LR    A,S
010B 62                 LISU  DSPR
010C 5E                 LR    D,A
010D 48                 LR    A,TEM1
010E 5C                 LR    S,A       COPY TO DISPLAY REGISTER
010F 28 03 13           PI    DSPY
0112 74                 LIS   4
0113 FA                 NS    FLG1
0114 94 17              BNZ   TM9       BRANCH IF RECORD
0116 74                 LIS   4
0117 F1                 NS    SW2
0118 84 0E              BZ    TM8       CHECK RECORD SWITCH
011A 4A                 LR    A,FLG1
011B 22 04              OI    4
011D 5A                 LR    FLG1,A    SET RECORD FLAG
011E 43                 LR    A,STAR
011F 21 EF              NI    H'EF'     RESET PLAY OUTPUT
0121 22 40              OI    H'40'
0123 B1                 OUTS  STAP
0124 53                 LR    STAR,A    SET RECORD OUTPUT
0125 90 06              BR    TM9
0127 43           TM8   LR    A,STAR
0128 22 10              OI    H'10'
012A B1                 OUTS  STAP      SET PLAY OUTPUT
012B 53                 LR    STAR,A
012C 63           TM9   LISU  TOD
012D 69                 LISL  1
012E 70                 LIS   0
012F EE                 XS    D
0130 94 04              BNZ   TM12
0132 EC                 XS    S
0133 84 89              BZ    TM1       BRANCH IF TOD = 0000
0135 4C           TM12  LR    A,S
0136 64                 LISU  TOS
0137 ED                 XS    I
0139 94 84              BNZ   TM1       BR IF TOD MIN NOT = TOS MIN
013A 4C                 LR    A,S
013B 63                 LISU  TOD
013C EE                 XS    D
013D 94 AF              BNZ   TM1       BR IF TOD & TOS HOURS NOT =
013F 20 FF              LI    H'FF'
0141 F1                 NS    SW2
0142 94 AA              BNZ   TM1       RETURN IF ANY SWITCH
0144 67                 LISU  DAYS
```

```
0145 EC              XS    S
0146 94 A6           BNZ   TM1         RETURN IF DAYS NOT ZERO
0148 63              LISU  TOD
0149 5D              LR    I,A
014A 5C              LR    S,A         RESET TOD TO ZERO
014B 29 03 65        JMP   PLAY
014E 65        TM2   LISU  RT
014F 90 80           BR    TM6
0151 64        TM3   LISU  TOS
0152 90 AD           BR    TM6
0154 67        TM4   LISU  DAYS
0155 90 AA           BR    TM6
0157 08        IT7   LR    K,P
0158 36              DS    TIM1
0159 84 10           BZ    TM10
015B 20 9B           LI    H'9B'
015D F1              NS    SW2
015E 84 39           BZ    TM7         RTN IF NOT TOD,TOS,RT
0160 20 40           LI    H'40'
0162 F1              NS    SW2
0163 84 34           BZ    TM7         RTN IF NOT FAST SET
0165 28 01 9A        PI    INCR
0168 90 2F           BR    TM7
016A 20 2E     TM10  LI    46
016C 56              LR    TIM1,A      RELOAD .413 SEC TIMER
016D 20 9A           LI    H'9A'
016F F1              NS    SW2
0170 84 09           BZ    TM16        BR IF NO SWITCH
0172 20 20           LI    H'20'
0174 F1              NS    SW2
0175 84 04           BZ    TM16        BRANCH IF NOT SLOW SET
0177 28 01 9A        PI    INCR
017A 37        TM16  DS    TIM2
017B 94 1C           BNZ   TM7         RTN IF NOT 1 MINUTE
017D 20 91           LI    145
017F 57              LR    TIM2,A      RELOAD 1 MIN TIMER
0180 63              LISU  TOD
0181 68              LISL  0
0182 70              LIS   0
0183 ED              XS    I
0184 94 04           BNZ   *+5
0186 EC              XS    S
0187 84 10           BZ    TM7         BRANCH IF TOD = 0000
0189 28 01 9A        PI    INCR
018C 94 0B           BNZ   TM7         STATUS = 0 IF 2400 HOURS
018E 67              LISU  DAYS
018F 20 FF           LI    H'FF'
0191 DC              ASD   S
0192 5C              LR    S,A         DECREMENT DAYS
0193 23 99           XI    H'99'
0195 94 02           BNZ   TM7         RTN IF DAYS NOT UNDERFLOWED
0197 5C              LR    S,A         RESET DAYS TO ZERO
0198 09        TM7   LR    P,K
0199 1C              POP

************ INCREMENT SUBROUTINE **********

019A 69        INCR  LISL  1
019B 4C              LR    A,S
019C 23 24           XI    H'24'
019E 94 02           BNZ   *+3         BRANCH IF NOT 2400 HOURS
01A0 5C              LR    S,A         RESET HOURS TO ZERO
01A1 68              LISL  0
01A2 20 67           LI    H'67'
01A4 DC              ASD   S           INCREMENT MINUTES
01A5 5C              LR    S,A
01A6 23 60           XI    H'60'
01A8 94 13           BNZ   TM13        RETURN IF NO OVERFLOW
01AA 5C              LR    S,A         RESET MINUTES TO ZERO
01AB 72              LIS   2
01AC F1              NS    SW2
01AD 94 0E           BNZ   TM13        IF DAYS, SKIP HOURS
01AF 69              LISL  1
01B0 20 67           LI    H'67'
01B2 DC              ASD   S           INCREMENT HOURS
```

```
0183 5C              LR     S,A
0184 20 10           LI     H'10'
0186 F1              NS     SW2
0187 94 05           BNZ    TM11       BRANCH IF RUN TIME
0189 4E              LR     A,0
018A 23 24           XI     H'24'
018C 1C         TM13 POP
018D 73         TM11 LIS    3
018E EC              XS     S
018F 94 FC           BNZ    TM13
01C1 5C              LR     S,A        RESET RUN TIME TO ZERO
01C2 1C              POP

************ UNTHREAD ROUTINE ************

01C3 1A         UNTH DI
01C4 7C              LIS    H'C'
01C5 F0              NS     SW1
01C6 23 0C           XI     H'C'
01C8 94 04           BNZ    *+5        ALREADY LOADED ?
01CA 29 00 53        JMP    INRT       YES
01CD 20 FB           LI     H'FB'      NO
01CF FA              NS     FLG1       RESET RECORD FLAG
01D0 22 02           OI     2
01D2 5A              LR     FLG1,A     SET UNLOAD FLAG
01D3 43              LR     A,STAR
01D4 22 20           OI     H'20'      SET STANDBY
01D6 21 AC           NI     H'AC'      RESET PLAY AND RECORD
01D8 B1              OUTS   STAP
01D9 53              LR     STAR,A
01DA 20 FD           LI     H'FD'
01DC F2              NS     CONR
01DD 80              OUTS   CONP       RESET TURNAROUND
01DE 52              LR     CONR,A
01DF 4A              LR     A,FLG1
01E0 22 08           OI     8
01E2 5A              LR     FLG1,A     SET BLANK FLAG
01E3 28 05 A1        PI     STM
01E6 28 03 13   U2   PI     DSPY
01E9 74              LIS    4
01EA F0              NS     SW1        EOL ?
01EB 94 06           BNZ    U1
01ED 28 05 38        PI     SLDF
01F0 90 F5           BR     U2
01F2 28 05 43   U1   PI     RLD
01F5 48              LR     A,FLG2
01F6 22 02           OI     2
01F8 5B              LR     FLG2,A     SET 15 IPS FLAG
01F9 28 05 C3        PI     BACC
01FC 20 EA      U3   LI     H'EA'
01FE 86              OUTS   6          ENABLE TIMER
01FF 20 B8           LI     184
0201 87              OUTS   7          LOAD 18 MS TIMER
0202 20 BC           LI     140
0204 56              LR     TIM1,A     LOAD 2.8 SEC TIMER
0205 2A 02 39        DCI    IT3
0208 0E              LR     Q,DC
0209 28 05 43        PI     RLD
020C 1B         U4   EI
020D 2B              NOP
020E 1A              DI
020F A4              INS    IPOP       CHECK HOLE
0210 21 02           NI     2
0212 84 F9           BZ     U4
0214 20 EA           LI     H'EA'
0216 86              OUTS   6
0217 20 B8           LI     184
0219 87              OUTS   7          18 MS TIMER
021A 20 9B           LI     155
021C 56              LR     TIM1,A     2.8 SEC TIMER
021D 73              LIS    3
021E 57              LR     TIM2,A     8.4 SEC TIMER
021F 2A 02 52        DCI    IT2
0222 0E              LR     Q,DC
0223 28 03 13   U6   PI     DSPY
```

```
0226 7C                  LIS   H'C'
0227 F0                  NS    SW1
0228 23 0C               XI    H'C'      BEGINNING OF LEADSCREW ?
022A 84 30               BZ    U5        IF YES, STOP
022C 1B                  EI
022D 28                  NOP
022E 1A                  DI
022F A4                  INS   IPOR
0230 21 02               NI    2         CHECK HOLE
0232 84 C9               BZ    U3        RESTART IF LOST HOLE
0234 28 05 3E            PI    SLD8
0237 90 E9               BR    U6
0239 36          IT3     DS    TIM1
023A 84 02              BZ    *+3
023C 1C                  POP
023D 20 C1               LI    H'C1'
023F 86                  OUTS  6         SET EXTERNAL INTERUPT
0240 28 05 A7            PI    DEC
0243 20 FD               LI    H'FD'
0245 FB                  NS    FLG2
0246 5B                  LR    FLG2,A    RESET 15 IPS FLAG
0247 28 05 C3            PI    BACC
024A 1B          U8      EI
024B 28                  NOP
024C 1A                  DI
024D 28 00 53            PI    INRT
0250 90 F9               BR    U8
0252 36          IT2     DS    TIM1
0253 94 0D               BNZ   U7
0255 20 9B               LI    155
0257 56                  LR    TIM1,A    RELOAD 2.8 SEC TIMER
0258 37                  DS    TIM2
0259 94 07               BNZ   U7
025B 28 05 43   U5       PI    RLD
025E 29 00 CE            JMP   STOP
0261 1C          U7      POP

************ THREAD ROUTINE ************

0262 29 00 53   A1      JMP    INRT
0265 7C         THRD    LIS    H'C'
0266 F0                 NS     SW1
0267 23 0C              XI     H'C'
0269 94 F8              BNZ    A1        RETURN IF NOT BOL
026B 72                 LIS    2
026C F4                 NS     INR
026D 84 F4              BZ     A1        DONT THREAD IF NO HOLE
026F 43                 LR     A,STAR
0270 22 20              OI     H'20'
0272 B1                 OUTS   STAP      OUTPUT STANDBY
0273 53                 LR     STAR,A
0274 4A                 LR     A,FLG1
0275 22 08              OI     8
0277 5A                 LR     FLG1,A    SET BLANK FLAG
0278 78         T1      LIS    8
0279 F0                 NS     SW1
027A 84 09              BZ     T2        BRANCH IF CONTACT
027C 28 05 38           PI     SLDF
027F 28 03 13           PI     DSPY
0282 90 F5              BR     T1
0284 28 05 43   T2      PI     RLD
0287 4B                 LR     A,FLG2
0288 22 02              OI     2
028A 5B                 LR     FLG2,A    SET 15 IPS FLAG
028B 28 05 C3           PI     BACC
028E 20 EA              LI     H'EA'
0290 86                 OUTS   6
0291 20 B8              LI     184
0293 87                 OUTS   7         SET 18 MS TIMER
0294 73                 LIS    3
0295 56                 LR     TIM1,A    SET 54 MS COUNTER
0296 20 11              LI     17
0298 57                 LR     TIM2,A    SET .9 SEC TIMER
0299 2A 03 05           DCI    IT5
```

```
029C  0E              LR    Q,DC
029D  28 03 13        PI    DSPY
02A0  1B              EI            STATUS = 0 AFTER DISPLAY
02A1  18              COM          SET TO NON-ZERO STATUS
02A2  1A              DI           INTERUPT WILL RESET TO ZERO
02A3  94 F9           BN7   *-6
02A5  28 05 A7        PI    DEC    STOP BWD LEADER WRAP
02A8  28 05 C8        PI    FACC   GO FWD AT .5 M/S
02AB  73              LIS   3
02AC  56              LR    TIM1,A LOAD 54 MS TIMER
02AD  20 21           LI    33
02AF  57              LR    TIM2,A LOAD 1.8 SEC TIMER
02B0  1B        T3    EI
02B1  71              LIS   1
02B2  1A              DI
02B3  84 20           BZ    T9     BR IF 1.8 SEC TIMED OUT
02B5  28 03 13        PI    DSPY
02B8  A4              INS   IPOR   BEFORE END OF LEADER
02B9  21 02           NI    2      LOOK FOR NO HOLE
02BB  94 F4           BNZ   T3     KEEP LOOKING
02BD  20 21           LI    33     OK - END OF LEADER
02BF  57              LR    TIM2,A RELOAD 1.8 SEC TIMER

02C0  28 03 13  T5    PI    DSPY
02C3  78              LIS   8
02C4  F0              NS    SW1    CONTACT ?
02C5  84 3A           BZ    T10    IF YES, BACK OFF
02C7  28 05 43        PI    RLD
02CA  1B              EI
02CB  71              LIS   1
02CC  1A              DI
02CD  84 09           BZ    T4     BRANCH AFTER 1.8 SEC
02CF  A4              INS   IPOR   LOOK FOR HOLE AGAIN
02D0  21 02           NI    2      HOPE WE DONT FIND IT
02D2  84 ED           BZ    T5
02D4  29 01 C3  T9    JMP   UNTH   OOPS! WE FOUND ONE
02D7  78        T4    LIS   8      NOW WE SHOULD FIND A HOLE
02D8  57              LR    TIM2,A WITHIN .45 SEC
02D9  1B        T6    EI
02DA  18              COM
02DB  1A              DI
02DC  84 F7           BZ    T9     BRANCH IF IT IS NOT FOUND
02DE  28 03 13        PI    DSPY
02E1  A4              INS   IPOR
02E2  21 02           NI    2
02E4  84 F4           BZ    T6     KEEP LOOKING FOR THE HOLE
02E6  20 4A           LI    74     GOT IT! NOW TRY TO FINISH
02E8  57              LR    TIM2,A BEFORE 4 SEC
02E9  28 05 38        PI    SLDF   DRIVE LEADSCREW IN
02EC  1B        T7    EI
02ED  71              LIS   1
02EE  1A              DI
02EF  84 0A           BZ    T8     BRANCH IF THE TIMER IS FIRST
02F1  28 03 13        PI    DSPY
02F4  7C              LIS   H'C'
02F5  F0              NS    SW1
02F6  23 04           XI    4
02F8  94 F3           BNZ   T7     LOOK FOR CONTACT AND EOL
02FA  28 05 43  T8    PI    RLD
02FD  29 00 CE        JMP   STOP
0300  28 05 3E  T10   PI    SLDB
0303  90 BC           BR    T5
0305  0B        ITS   LR    K,P
0306  36              DS    TIM1
0307  94 09           BNZ   T11
0309  A4              INS   IPOR   READ STEPPER STATUS
030A  54              LR    INR,A
030B  28 05 09        PI    STON
030E  73              LIS   3
030F  56              LR    TIM1,A RELOAD 54 MS TIMER
0310  37              DS    TIM2
0311  09        T11   LR    P,K
0312  1C              POP
```

********** DISPLAY ROUTINE **********

```
0313 62              DSPY  LISU  DSPR
0314 45                    LR    A,DSP
0315 12                    SR    1            SHIFT DIGIT STROBE
0316 21 OF                 NI    H'OF'        MASK
0318 84 3F                 BZ    D1           IF NO STROBE, GO MAKE ONE
031A 55                    LR    DSP,A        IF YOU GOT IT, STORE IT
031B 71                    LIS   1
031C EB                    XS    FLG2         TOGGLE DIGIT FLAG
031D 5B                    LR    FLG2,A       AND STORE
031E 73                    LIS   3
031F F5                    NS    DSP
0320 84 41                 BZ    D2           BRANCH IF DIGITS 3 OR 4
0322 68                    LISL  0            SET INDEX = DIGITS 1 & 2
0323 71              D3    LIS   1
0324 B4                    OUTS  IPOR         OUTPUT LATCH
0325 FB                    NS    FLG2         CHECK DIGIT FLAG
0326 84 04                 BZ    D4           BRANCH IF DIGIT 2 OR 4
0328 4C                    LR    A,S          READ DISPLAY DATA
0329 90 03                 BR    D5           BUT DON'T SHIFT
032B 4C              D4    LR    A,S          READ DISPLAY DATA
032C 14                    SR    4            THIS TIME SHIFT
032D 18              D5    COM                INVERT THE DATA
032E 21 OF                 NI    H'F'         AND MASK IT
0330 B5                    OUTS  DSPP         OUTPUT BCD DIGIT
0331 23 OF                 XI    H'F'
0333 84 05                 BZ    *+6          BRANCH IF DIGIT = 0
0335 20 OF                 LI    H'OF'
0337 FA                    NS    FLG1         RESET DIGIT BLANK
0338 5A                    LR    FLG1,A
0339 20 28                 LI    H'28'
033B FA                    NS    FLG1         CHECK BLANK FLAG
033C 94 02                 BNZ   *+3          IF SET, DONT RESET LATCH
033E B4                    OUTS  IPOR         CLEAR LATCH IF NOT BLANK
033F 45                    LR    A,DSP
0340 B5                    OUTS  DSPP         NOW OUTPUT THE STROBE
0341 60                    LISU  0            RESET TO READ SWITCHES
0342 71              D9    LIS   1
0343 FB                    NS    FLG2
0344 94 08                 BNZ   D6           BRANCH IF DIGIT 1 OR 3
0346 A5                    INS   DSPP         READ SWITCHES
0347 EC                    XS    S            COMPARE WITH OLD DATA
0348 21 F0                 NI    H'F0'        ONLY 4 MSBS
034A 94 09           D7    BNZ   D8           BRANCH IF DATA CHANGED
034C 1C                    POP                RETURN IF DATA SAME
034D A5              D6    INS   DSPP
034E 14                    SR    4            SHIFT TO LOW 4 BITS
034F EC                    XS    S            COMPARE WITH OLD DATA
0350 21 OF                 NI    H'OF'        MASK TO LOW BITS ONLY
0352 90 F7                 BR    D7
0354 EC              D8    XS    S            INVERT DATA THAT CHANGED
0355 5C                    LR    S,A          AND STORE NEW DATA
0356 90 EB                 BR    D9           READ AGAIN TO BE SURE
0358 78              D1    LIS   8
0359 55                    LR    DSP,A        SET DIGIT FOUR STROBE
035A 4B                    LR    A,FLG2
035B 21 FE                 NI    H'FE'
035D 5B                    LR    FLG2,A
035E 4A                    LR    A,FLG1
035F 22 20                 OI    H'20'        SET DIGIT BLANK FLAG
0361 5A                    LR    FLG1,A
0362 69              D2    LISL  1            SET INDEX TO DIGITS 3 & 4
0363 90 BF                 BR    D3
```

********** PLAY ROUTINE **********

```
0365 7C              PLAY  LIS   H'C'
0366 F0                    NS    SW1
0367 23 04                 XI    4            CHECK LEADSCREW
0369 94 32                 BNZ   A2           DONT PLAY IF NOT EOL
036B 72                    LIS   2
036C F4                    NS    INR          CHECK HOLE
036D 94 2E                 BNZ   A2           DONT PLAY IF NO TAPE
036F 4A                    LR    A,FLG1
```

```
0370 22 02            OI     2
0372 5A               LR     FLG1,A    SET PLAY FLAG
0373 21 04            NI     4
0375 94 09            BNZ    PL12
0377 43               LR     A,STAR
0378 22 10            OI     H'10'
037A 81               OUTS   STAP      SET PLAY OUTPUT
037B 53               LR     STAR,A
037C 28 05 48         PI     DTRC
037F 71      PL12     LIS    1
0380 F0               NS     SW1       CHECK BOT
0381 94 1D            BZ     PL1
0383 20 20            LI     H'20'
0385 F4               NS     INR       ODD ?
0386 94 0C            BNZ    PL2       IF ODD , NO WORRY
0388 20 10            LI     H'10'     IF EVEN , CHECK END
038A F4               NS     INR
038B 84 04            BZ     *+5
038D 29 00 CE         JMP    STOP      END OF TAPE
0390 28 04 F4         PI     STUP      OR WRONG TRACK
0393 4B      PL2      LR     A,FLG2
0394 22 04            OI     4
0396 5B               LR     FLG2,A    SET FORWARD FLAG
0397 28 05 C8         PI     FACC
039A 90 17            BR     PL4
039C 29 00 53  A2     JMP    INPT
039F 20 20   PL1      LI     H'20'
03A1 F4               NS     INR       CHECK ODD
03A2 84 08            BZ     PL3
03A4 72               LIS    2
03A5 F0               NS     SW1       NOW CHECK EOT
03A6 84 EC            BZ     PL2
03A8 28 04 F4         PI     STUP      WRONG TRACK IF EOT&ODD
03AB 20 FB   PL3      LI     H'FB'
03AD FB               NS     FLG2
03AE 5B               LR     FLG2,A    RESET FORWARD FLAG
03AF 28 05 C3         PI     BACC      AND GO BACKWARDS
03B2 A4      PL4      INS    IPOR
03B3 21 08            NI     8
03B5 94 FC            BZ     PL4       WAIT FOR VERTICAL
03B7 20 FD            LI     H'FD'
03B9 F2               NS     CONR
03BA 80               OUTS   CONP      RESET TURNAROUND
03BB 52               LR     CONR,A
038C 74      PL5      LIS    4
038D FA               NS     FLG1
03BE 84 08            BZ     *+9       BRANCH IF NO RECORD FLAG
03C0 43               LR     A,STAR
03C1 22 40            OI     H'40'     SET/RECORD OUTPUT
03C3 21 EF            NI     H'EF'     RESET PLAY OUTPUT
03C5 81               OUTS   STAP
03C6 53               LR     STAR,A
03C7 28 00 53         PI     INRT
03CA 20 EB            LI     H'EB'
03CC B6               OUTS   6
03CD 2A 04 9C         DCI    ITB
03D0 0E               LR     Q,DC
03D1 1B               EI
03D2 2B               NOP
03D3 1A               DI
03D4 20 20            LI     H'20'
03D6 F0               NS     SW1       CHECK TIMER SWITCH
03D7 84 32            BZ     PL6
03D9 20 C0            LI     H'C0'
03DB F7               NS     TIM2
03DC 23 0C            XI     H'C'
03DE 84 05            BZ     PL16      BRANCH IF OVER 1 MINUTE
03E0 70               LIS    0
03E1 E7               XS     TIM2
03E2 94 3D            BNZ    PL7       BRANCH IF 1 MIN NOT TIMED
03E4 20 91   PL16     LI     145
03E6 57               LR     TIM2,A    RELOAD 1 MIN TIMER
03E7 65               LISU   PT
03E8 68               LISL   0
03E9 20 FF            LI     H'FF'
```

```
03EB DC                    ASD   S        DECREMENT MINUTES
03EC 5C                    LR    S,A
03ED 23 99                 XI    H'99'
03EF 94 08                 BNZ   PL14     BRANCH IF NO UNDERFLOW
03F1 69                    LISL  1
03F2 3C                    DS    S        DECREMENT HOURS
03F3 4E                    LR    A,D
03F4 18                    COM
03F5 94 0F                 BNZ   PL15     BRANCH IF NO UNDERFLOW
03F7 5D                    LR    I,A      RESET MINUTES TO ZERO
03F8 5C                    LR    S,A      RESET HOURS TO ZERO
03F9 90 26                 BR    PL7
03FB 70       PL14         LIS   0
03FC ED                    XS    I
03FD 94 22                 BNZ   PL7      BRANCH IF MIN NOT ZERO
03FF EC                    XS    S
0400 94 1F                 BNZ   PL7      BRANCH IF HOURS NOT ZERO
0402 29 00 CE              JMP   STOP
0405 20 59    PL15         LI    H'59'
0407 5C                    LR    S,A      RESET MINUTES TO 59
0408 90 17                 BR    PL7
040A 74       PL6          LIS   4
040B FA                    NS    FLG1     CHECK RECORD FLAG
040C 94 13                 BNZ   PL7      IF SET, SKIP MANUAL STEP
040E 71                    LIS   1
040F FA                    NS    FLG1     CHECK MANUAL STEP FLAG
0410 94 0F                 BNZ   PL7
0412 20 60                 LI    H'60'
0414 F1                    NS    SW2
0415 84 0A                 BZ    PL7      CONTINUE IF NO STEP KEY
0417 13                    SL    1
0418 91 04                 BM    PL13
041A 29 05 25              JMP   MSTD
041D 29 05 20 PL13         JMP   MSTU
0420 28 05 48 PL7          PI    DTRC
0423 73                    LIS   3
0424 F0                    NS    SW1      DO WE HAVE BOT OR EOT ?
0425 84 96                 BZ    PL5      IF NOT, DONT TRY T/A
0427 74                    LIS   4
0428 FB                    NS    FLG2     CHECK FORWARD FLAG
0429 94 03                 BNZ   *+4
042B 74                    LIS   4
042C 12                    SR    1
042D 12                    SR    1        SET BIT 1 IF FWD, 0 IF BWD
042E F0                    NS    SW1      AND WITH BOT & EOT
042F 84 8C                 BZ    PL5
0431 15                    SL    4
0432 F4                    NS    INR
0433 21 10                 NI    H'10'    SEE IF LAST TRACK
0435 84 08                 BZ    *+9      IF NOT, CONTINUE
0437 13                    SL    1
0438 F4                    NS    INR      NOW CHECK ODD
0439 94 04                 BNZ   *+5
043B 29 00 CE              JMP   STOP     END OF TAPE
043E 74                    LIS   4
043F FA                    NS    FLG1
0440 84 40                 BZ    PL8      BRANCH IF NOT RECORD
0442 74                    LIS   4        START RECORD TURNAROUND
0443 58                    LR    TEM1,A   SET 1.65 SEC COUNTER
0444 1B       PL9          EI
0445 2A 04 9C              DCI   IT8
0448 0E                    LR    Q,DC
0449 1A                    DI
044A 28 03 13              PI    DSPY
044D 70                    LIS   0
044E E8                    XS    TEM1     TIMED OUT ?
044F 94 F4                 BNZ   PL9      BRANCH IF NOT
0451 A4                    INS   IPOR
0452 21 08                 NI    8
0454 94 FC                 BNZ   *-3      INSURE VERT NOT THERE YET
0456 42                    LR    A,CONR
0457 22 08                 OI    8
0459 52                    LR    CONR,A
045A 80                    OUTS  CONR     SET COUNTDOWN
```

```
045B A4              INS   IPOR
045C 21 08           NI    8
045E 84 FC           BZ    *-3        WAIT FOR NEXT VERTICAL
0460 A4         PL10 INS   IPOR
0461 21 08           NI    8
0463 94 FC           BNZ   *-3        WAIT FOR IT TO END
0465 42              LR    A,CONR
0466 22 02           OI    2
0468 52              LR    CONR,A
0469 B0              OUTS  CONP       SET TURNAROUND
046A 44              LR    A,INR
046B 12              SR    1
046C E2              XS    CONR       BE SURE OF RIGHT TRACK
046D 21 10           NI    H'10'
046F 94 04           BNZ   *+5
0471 28 04 F4        PI    STUP
0474 28 05 A7        PI    DEC
0477 74              LIS   4
0478 FB              NS    FLG2       CHECK IF LAST FORWARD
0479 84 04           BZ    *+5
047B 29 03 AB        JMP   PL3
047E 29 03 93        JMP   PL2
0481 20 17      PL8  LI    23
0483 56              LR    TIM1,A
0484 78              LIS   8
0485 58              LR    TEM1,A     SET 3.3 SEC TIMER
0486 1B         PL11 EI
0487 2A 04 9C        DCI   IT8
048A 0E              LR    Q,DC
048B 1A              DI
048C 28 03 13        PI    DSPY
048F 70              LIS   0
0490 E8              XS    TEM1       CHECK IF 3.3 SEC ELAPSED
0491 84 CE           BZ    PL10       IF SO TURNAROUND
0493 A4              INS   IPOR
0494 21 0C           NI    H'C'       CHECK V DRIVE AND TA FLAG
0496 23 0C           XI    H'C'
0498 94 ED           BNZ   PL11       KEEP LOOKING FOR BOTH
049A 90 C5           BR    PL10       GOT EM, NOW TURNAROUND
049C 36         IT8  DS    TIM1
049D 94 0A           BNZ   *+11
049F 20 FE           LI    H'FE'
04A1 FA              NS    FLG1
04A2 5A              LR    FLG1,A     RESET STEP FLAG
04A3 20 17           LI    23
04A5 56              LR    TIM1,A
04A6 37              DS    TIM2
04A7 38              DS    TEM1
04A8 1C              POP

******** BACKSPACE ROUTINE ************

04A9 7C         BKSP LIS   H'C'
04AA F0              NS    SW1
04AB 23 04           XI    4
04AD 84 04           BZ    *+5
04AF 29 00 53        JMP   INRT       DONT GO IF NOT LOADED
04B2 4A              LR    A,FLG1
04B3 22 02           OI    2          SET PLAY FLAG
04B5 5A              LR    FLG1,A
04B6 43              LR    A,STAR
04B7 22 10           OI    H'10'      SET PLAY OUTPUT
04B9 81              OUTS  STAP
04BA 53              LR    STAR,A
04BB 20 20           LI    H'20'
04BD F4              NS    INR
04BE 94 0A           BNZ   BK1        BRANCH IF ODD TRACK
04C0 48         BK2  LR    A,FLG2
04C1 22 04           OI    4          SET FORWARD FLAG
04C3 5B              LR    FLG2,A
04C4 28 05 C8        PI    FACC
04C7 90 08           BR    BK3
04C9 48         BK1  LR    A,FLG2
04CA 21 FB           NI    H'FB'      RESET FORWARD FLAG
04CC 5B              LR    FLG2,A
```

```
04CD 28 05 C3           PI   BACC
04D0 28 00 53      BK3  PI   INRT
04D3 72                 LIS  2
04D4 F1                 NS   SW2
04D5 94 04              BNZ  *+5      BRANCH IF STILL BKSP SWITCH
04D7 29 00 CE           JMP  STOP
04DA 73                 LIS  3
04DB F0                 NS   SW1
04DC 84 F3              BZ   BK3      BRANCH IF NOT BOT OR EOT
04DE 74                 LIS  4
04DF F8                 NS   FLG2
04E0 94 03              BNZ  *+4
04E2 74                 LIS  4
04E3 12                 SR   1
04E4 12                 SR   1
04E5 F0                 NS   SW1
04E6 84 E9              BZ   BK3      BRANCH IF LEAVING END ZONE
04E8 28 05 09           PI   STDN
04EB 28 05 A7           PI   DEC
04EE 74                 LIS  4
04EF F8                 NS   FLG2
04F0 94 D8              BNZ  BK1      BRANCH IF LAST FWD
04F2 90 CD              BR   BK2

********* HEAD STEPPER SUBROUTINES *****

04F4 66            STUP LISU TRK
04F5 68                 LISL 0
04F6 20 30              LI   H'30'
04F8 F4                 NS   INR
04F9 23 10              XI   H'10'
04FB 84 0C              BZ   SU1      BRANCH IF LAST TRACK
04FD 43                 LR   A,STAR
04FE 22 08              OI   8        RESET BWD STEP
0500 23 04              XI   4        TOGGLE SEEK ODD
0502 53                 LR   STAR,A
0503 B1                 OUTS STAP
0504 20 67              LI   H'67'
0506 DC                 ASD  S
0507 5C                 LR   S,A      INCREMENT TRACK NO.
0508 1C            SU1  POP 0509 66            STDN LISU TRK
050A 68                 LISL 0
050B 20 30              LI   H'30'
050D F4                 NS   INR
050E 23 30              XI   H'30'
0510 84 0C              BZ   SD1      BRANCH IF TRACK 1
0512 74                 LIS  4
0513 E3                 XS   STAR     TOGGLE SEEK ODD
0514 21 F7              NI   H'F7'    SET BWD STEP
0516 53                 LR   STAR,A
0517 B1                 OUTS STAP
0518 20 FF              LI   H'FF'
051A DC                 ASD  S
051B 5C                 LR   S,A      DECREMENT TRACK NO.
051C 1C                 POP
051D 71            SD1  LIS  1
051E 5C                 LR   S,A      SET TRACK NO. TO 1
051F 1C                 POP 0520 28 04 F4      MSTU PI   STUP
0523 90 04              BR   MS1
0525 28 05 09      MSTD PI   STDN
0528 71            MS1  LIS  1
0529 EA                 XS   FLG1
052A 5A                 LR   FLG1,A   SET STEP FLAG
052B 20 17              LI   23
052D 56                 LR   TIM1,A   RELOAD TIMER
052E 72                 LIS  2
052F FA                 NS   FLG1     CHECK PLAY FLAG
0530 94 04              BNZ  MS2
0532 29 00 53           JMP  INRT
0535 29 04 20      MS2  JMP  PL7
```

******* SLDF, SLDB, AND RLD *******

```
053B 43            SLDF  LR    A,STAR      SET LEADSCREW FORWARD
0539 22 01               OI    1
053B 53            LS1   LR    STAR,A
053C 81                  OUTS  STAP
053D 1C                  POP
053E 43            SLDB  LR    A,STAR      SET LEADSCREW BACKWARDS
053F 22 02               OI    2
0541 90 F9               BR    LS1
0543 20 FC         PLD   LI    H'FC'       RESET LEADSCREW
0545 F3                  NS    STAR
0546 90 F4               BR    LS1
```

***** DTRC (DETECT RECORD) *******

```
0548 20 10         DTRC  LI    H'10'
054A F0                  NS    SW1
054B 94 38               BNZ   DT1         BRANCH IF PWR PAC
054D 41                  LR    A,SW2
054E 15                  SL    4
054F 91 49               BM    DT3         PLAY SWITCH
0551 13                  SL    1
0552 91 42               BM    DT2         RECORD SWITCH
0554 74            DT4   LIS   4
0555 FA                  NS    FLG1
0556 84 2A               BZ    DT6         BRANCH IF NO RECORD FLAG
0558 A4                  INS   IPOR
0559 21 08               NI    8
055B 84 FC               BZ    *-3         WAIT FOR VERTICAL
055D 7F                  LIS   H'F'
055E F3                  NS    STAR
055F 22 10               OI    H'10'       SET PLAY OUTPUT
0561 81                  OUTS  STAP        RESET RECORD OUTPUT
0562 53                  LR    STAR,A
0563 28 05 A7            PI    DEC
0566 74                  LIS   4
0567 F8                  NS    FLG2
0568 94 06               BNZ   *+7         BRANCH IF FWD FLAG
056A 28 05 C8            PI    FACC
056D 90 04               BR    *+5
056F 28 05 C3            PI    BACC
0572 7A                  LIS   10
0573 5B                  LR    TEM1,A      LOAD VERTICAL COUNT
0574 A4            DT5   INS   IPOR
0575 21 08               NI    8
0577 94 FC               BNZ   DT5         WAIT FOR VERTICAL
0579 A4                  INS   IPOR
057A 21 08               NI    8
057C 84 FC               BZ    *-3         NOW WAIT FOR IT TO END
057E 3B                  DS    TEM1
057F 94 F4               BNZ   DT5
0581 29 00 CE      DT6   JMP   STOP
0584 7C            DT1   LIS   H'C'
0585 F1                  NS    SW2
0586 23 0C               XI    H'C'
0588 84 0C               BZ    DT2         BRANCH IF PLAY & REC SWITCH
058A 20 10               LI    H'10'
058C F1                  NS    SW2
058D 94 C6               BNZ   DT4         STOP SWITCH
058F E1                  XS    SW2
0590 81 0F               BP    DT7         BR IF NOT UNLOAD SWITCH
0592 29 01 C3            JMP   UNTH
0595 4A            DT2   LR    A,FLG1
0596 22 04               OI    4
0598 5A                  LR    FLG1,A      SET RECORD FLAG
0599 74            DT3   LIS   4
059A F2                  NS    CONR
059B 94 04               BNZ   DT7         BRANCH IF FULL COUNT
059D 29 03 7F            JMP   PL12
05A0 1C            DT7   POP
```

******** STM SUBROUTINE ********

```
05A1  20 60        STM     LI    H'60'
05A3  F2                   NS    CONR
05A4  94 02                BNZ   DEC       BRANCH IF MOTION
05A6  1C                   POP
```

******** RAMP SUBROUTINE ********

```
05A7  20 60        DEC     LI    H'60'
05A9  E2                   XS    CONR      REVERSE ENABLES
05AA  21 FB                NI    H'FB'     RESET F COUNT
05AC  22 08                OI    H'08'     SET COUNT DOWN
05AE  52                   LR    CONR,A
05AF  B0                   OUTS  CONP
05B0  21 02                NI    2
05B2  84 2D                BZ    R1        BRANCH IF NOT T/A
05B4  20 10                LI    H'10'
05B6  F0                   NS    SW1
05B7  94 06                BNZ   R9        BRANCH IF POWER PAC
05B9  20 3C                LI    60
05BB  05                   LR    KL,A
05BC  90 26                BR    R2
05BE  20 1E        R9      LI    30
05C0  05                   LR    KL,A      LOAD K3 CONSTANT
05C1  90 21                BR    R2
05C3  42           BACC    LR    A,CONR
05C4  22 C0                OI    H'C0'     SET EN BWD AND RST ZCT
05C6  90 04                BR    R4
05C8  42           FACC    LR    A,CONR
05C9  22 80                OI    H'80'     SET EN FWD, FWD, AND RST ZCT
05CB  80           R4      OUTS  CONP
05CC  52                   LR    CONR,A
05CD  72                   LIS   2
05CE  F2                   NS    CONR
05CF  84 10                BZ    R1        BRANCH IF NOT T/A
05D1  20 10                LI    H'10'
05D3  F0                   NS    SW1
05D4  94 E9                BNZ   R9        BRANCH IF POWER PAC
05D6  20 46                LI    70
05D8  05                   LR    KL,A
05D9  90 09                BR    R2
05DB  20 26        R10     LI    38
05DD  05                   LR    KL,A      LOAD K1 CONSTANT
05DE  90 04                BR    R2
05E0  20 DC        R1      LI    220
05E2  05                   LR    KL,A      LOAD K2 CONSTANT
05E3  72           R2      LIS   2
05E4  FB                   NS    FLG2
05E5  84 05                BZ    R3        BRANCH IF NOT 15 IPS
05E7  78                   LIS   8
05E8  59                   LR    TEM2,A    LOAD 8 STEPS
05E9  90 04                BR    R7
05EB  20 40        R3      LI    64
05ED  59                   LR    TEM2,A    LOAD 64 STEPS
05EE  71           R7      LIS   1
05EF  B4                   OUTS  IPOP      BLANK DISPLAY
05F0  1A           R11     DI
05F1  71                   LIS   1
05F2  E2                   XS    CONR
05F3  80                   OUTS  CONP
05F4  42                   LR    A,CONR    OUTPUT PULSE
05F5  80                   OUTS  CONP
05F6  39                   DS    TEM2
05F7  84 0D                BZ    R8        BRANCH IF LAST STEP
05F9  01                   LR    A,KL
05FA  58                   LR    TEM1,A
05FB  1A                   DI              NOP
05FC  38                   DS    TEM1
```

```
05FD 94 FD           BNZ   *-2        K DELAY
05FF 10              LR    DC,H       NOP
0600 10              LR    DC,H       NOP
0601 10              LR    DC,H       NOP
0602 1A              DI               NOP
0603 90 EC           BR    R11
0605 78       R8     LIS   8
0606 F2              NS    CONR
0607 84 0F           BZ    R5         BRANCH IF NOT CTDN
0609 E2              XS    CONR       RESET COUNTDOWN
060A 21 EF           NI    H'EF'      RESET FORWARD
060C B0              OUTS  CONP
060D 52              LR    CONR,A
060E 21 02           NI    2
0610 94 0F           BNZ   R6         BRANCH IF T/A
0612 7F              LIS   H'F'
0613 F2              NS    CONR
0614 52              LR    CONR,A
0615 B0              OUTS  CONP       RESET ENABLES AND SET Z CT
0616 1C              POP
0617 72       R5     LIS   2
0618 F9              NS    FLG2
0619 94 06           BNZ   R6         IF 15 IPS, RETURN
061B 42              LR    A,CONR
061C 22 04           OI    4          SET F COUNT
061E 52              LR    CONR,A
061F B0              OUTS  CONP
0620 1C       R6     POP
                     END
```

SYMBOL TABLE

| | | | | | | | |
|---|---|---|---|---|---|---|---|
| A1 | 0262 | A2 | 039C | BACC | 05C3 | BK1 | 04C9 |
| BK2 | 04C0 | BK3 | 04D0 | BKSP | 04A9 | CONP | 0000 |
| CONR | 0002 | D1 | 0358 | D2 | 0362 | D3 | 0323 |
| D4 | 032B | D5 | 032D | D6 | 034D | D7 | 034A |
| D8 | 0354 | D9 | 0342 | DAYS | 0007 | DEC | 05A7 |
| DSP | 0005 | DSPP | 0005 | DSPR | 0002 | DSPY | 0313 |
| DT1 | 0584 | DT2 | 0595 | DT3 | 0599 | DT4 | 0554 |
| DT5 | 0574 | DT6 | 0581 | DT7 | 05A0 | DTRC | 0548 |
| FALC | 05CB | FLG1 | 000A | FLG2 | 000B | I10 | 008B |
| I11 | 0098 | I12 | 00C6 | I2 | 006C | I3 | 0079 |
| I4 | 00A7 | I5 | 00CB | I6 | 00AF | I7 | 00B2 |
| I8 | 0095 | I9 | 00BB | INCR | 019A | INR | 0004 |
| INRT | 0053 | INTT | 0020 | INTX | 00A0 | IPOP | 0004 |
| IT1 | 0044 | IT2 | 0252 | IT3 | 0239 | IT5 | 0305 |
| IT7 | 0157 | IT8 | 049C | LS1 | 053B | MS1 | 0528 |
| MS2 | 0535 | MSTD | 0525 | MSTU | 0520 | P1 | 0007 |
| P2 | 000A | P3 | 003E | P4 | 003B | P5 | 0035 |
| PL1 | 039F | PL10 | 0460 | PL11 | 0486 | PL12 | 037F |
| PL13 | 041D | PL14 | 03FB | PL15 | 0405 | PL16 | 03E4 |
| PL2 | 0393 | PL3 | 03AB | PL4 | 03B2 | PL5 | 03BC |
| PL6 | 040A | PL7 | 0420 | PL8 | 0481 | PL9 | 0444 |
| PLAY | 0355 | R1 | 05E0 | R10 | 05DB | R11 | 05F0 |
| R2 | 05E3 | R3 | 05EB | R4 | 05CB | R5 | 0617 |
| R6 | 0620 | R7 | 05EE | R8 | 0605 | R9 | 058E |
| RLD | 0543 | RT | 0005 | SD1 | 051D | SLDB | 053E |
| SLDF | 053B | STAP | 0001 | STAR | 0003 | STDN | 0509 |
| STM | 05A1 | STOP | 00CE | STUP | 04F4 | SU1 | 0508 |
| SW1 | 0000 | SW2 | 0001 | T1 | 027B | T10 | 0300 |
| T11 | 0311 | T2 | 0284 | T3 | 0280 | T4 | 02D7 |
| T5 | 02C0 | T6 | 02D9 | T7 | 02EC | T8 | 02FA |
| T9 | 02D4 | TEM1 | 0008 | TEM2 | 0009 | THRD | 0265 |
| TIM1 | 0006 | TIM2 | 0007 | TIME | 00E1 | TM1 | 00ED |
| TM10 | 016A | TM11 | 01BD | TM12 | 0135 | TM13 | 018C |
| TM16 | 0174 | TM2 | 014E | TM3 | 0151 | TM4 | 0154 |
| TM5 | 0107 | TM6 | 0100 | TM7 | 0198 | TM8 | 0127 |
| TM9 | 012C | TOD | 0003 | TOS | 0004 | TRK | 0006 |
| U1 | 01F2 | U2 | 01E6 | U3 | 01FC | U4 | 020C |
| U5 | 025B | U6 | 0223 | U7 | 0261 | U8 | 024A |
| UNTH | 01C3 | | | | | | |

I claim:

1. For use in a video recorder of the longitudinal type, a method for recording sequential, time-spaced scenes of video information from a video camera on a recording tape in such a manner that the scenes may be reproduced without loss of synchronization, said method comprising the steps of:
decelerating the tape to a stop after recording a scene;
backspacing the tape for a preselected time or distance;
accelerating the tape to recording speed in the original direction upon actuation of a control to begin recording the next scene;
reading synchronization signals from the tape;
synchronizing movement of the tape, as determined from the synchronization signals read therefrom, with synchronization signals associated with the video camera; and
switching the recorder to a recording mode to record the next scene;
wherein said synchronizing step includes synchronizing horizontal synchronization pulses read from the tape with horizontal synchronization pulses used to operate the camera, and resetting vertical synchronization of the camera to correspond to vertical synchronization signals read from the tape;
and wherein said steps of accelerating the tape, reading synchronization signals and synchronizing movement of the tape are performed with such speed as to minimize delay at the start of recording each scene.

2. For use in a video tape recorder of the longitudinal type, a method for recording on a tape a plurality of sequential, time-spaced scenes of video information derived from a video camera, said method comprising the steps of:
(1) continually monitoring the camera to detect when it has been switched off to end the recording of a scene, and, when such switching off is detected, performing steps (2)–(5);
(2) decelerating the tape to a stop:
(3) accelerating the tape to recording speed in the opposite direction;
(4) moving the tape in the opposite direction for a preselected time;
(5) decelerating the tape to a stop again;
(6) continually monitoring the camera to detect when it has been switched on to begin recording a scene, and, when such switching on is detected, performing steps (7)–(11);
(7) accelerating the tape to recording speed in the original direction;
(8) reading synchronization signals from the tape;
(9) adjusting the tape speed to provide horizontal synchronization signals in synchronization with internally generated horizontal synchronization signals used to control the camera;
(10) resetting vertical synchronization of the camera on detection of a vertical synchronization signal from the tape; and
(11) switching the recorder to recording mode to begin recording the next scene in exact horizontal and vertical synchronization with the previous scene.

3. A method as set forth in claim 2, wherein said steps of accelerating and decelerating are effected by:
generating a variable-frequency signal;
comparing the phase of the variable-frequency signal with that of an oscillatory signal derived from a tachometer coupled to a tape-drive motor; and
utilizing a difference signal derived from said comparing step to adjust the speed of the motor, and the tape, to maintain the motor speed in relationship with the variable-frequency signal;
whereby the variable-frequency signal is increased in frequency during acceleration, from zero to a maximum, and is decreased in frequency during deceleration.

4. Apparatus for recording a plurality of sequential, time-spaced scenes of video information, obtained from a video camera, on a recording tape in such a manner that the scenes may be reproduced without loss of synchronization, said apparatus comprising:
tape transport means, including a motor, for moving the tape longitudinally with respect to a record/playback transducer;
motor speed regulation means for synchronizing the motor with respect to an oscillatory signal;
recorder control means for controlling said tape transport means and said motor speed regulation means and for providing appropriate oscillatory signals to said motor speed regulation means to effect deceleration and back-spacing of the tape at the end of a recorded scene, and acceleration of the tape at the beginning of recording the next scene;
means for obtaining synchronization signals from the tape;
means for synchronizing tape movement, as determined from the tape-derived synchronization signals, with synchronization signals associated with the video camera, said means for synchronizing tape movement including
means for comparing horizontal synchronization signals obtained from the tape with horizontal synchronization signals generated independently at a reference frequency and employed to control the camera, and
means responsive to detection of a vertical synchronization signal obtained from the tape, for resetting vertical synchronization of the camera; and
means integral with said recorder control means, for switching to a recording mode when the tape movement is fully synchronized with the video camera.

5. Apparatus as set forth in claim 4, wherein:
said motor speed regulation means includes a feedback circuit comprising a tachometer coupled to said motor, phase comparator means for comparing said oscillatory signal with a signal generated in said tachometer, and for generating a difference signal therefrom, and motor drive amplifier means, for controlling said motor in response to said difference signal.

6. Apparatus as set forth in claim 5, wherein:
during acceleration and deceleration, said oscillatory signal input to said phase comparator means is supplied by said recorder control means;
in the recording mode, said oscillatory signal is derived from a reference frequency; and
in the playback mode, said oscillatory signal is derived from said means for comparing horizontal synchronization signals.

7. Apparatus as set forth in claim 6, wherein:
said means for comparing horizontal synchronization signals obtained from the tape with horizontal synchronization signals at the reference frequency, include second phase comparator means having means for generating a difference signal therefrom; and said apparatus further includes variable oscillator means for generating an oscillatory signal of which the frequency is in part dependent upon said difference signal.

8. A video recording system capable of recording a plurality of time-spaced video scenes from a video camera in such a manner that the scenes may be reproduced without loss of synchronization, said system comprising:

tape transport means, including a motor, for moving a recording tape longitudinally with respect to a stationary record/playback transducer;

first motor servo control means, for detecting the motor speed and adjusting it to match an oscillatory signal;

second motor servo control means, operative only in playback mode, for detecting synchronization signals recorded on the tape and adjusting the frequency of said oscillatory signal accordingly to synchronize tape movement with a reference oscillatory signal;

a video camera; and recorder control means for
  (a) generating oscillatory signals of appropriately varying frequency to decelerate the tape to a stop on deactuation of said video camera, to accelerate the tape in the opposite direction, to backspace the tape for a preselected time, to decelerate the tape to a stop again, and to accelerate the tape in the original direction in response to actuation of the camera;
  (b) detecting a vertical synchronization signal recorded on the tape;
  (c) resetting synchronization of said video camera on detection of the vertical synchronization signal; and
  (d) switching to the recording mode to record the next scene in synchronization with the previous one.

* * * * *